Patented Dec. 29, 1953

2,664,400

UNITED STATES PATENT OFFICE 2,664,400

REACTION PRODUCTS OF AN OCTYL ACID PYROPHOSPHATE AND SOYAMINE AND LUBRICANTS CONTAINING THE SAME

Willard H. Woodstock, Crete, and Thomas M. Beck, Homewood, Ill., assignors to Victor Chemical Works, a corporation of Illinois No Drawing. Application August 13, 1949, Serial No. 110,236

5 Claims. (Cl. 252—32.5)

This invention relates to reaction products of an octyl acid pyrophosphate and a soyamine, and lubricants containing the same. This reaction product when added in small amounts to lubricating oils has been found capable of protecting metal surfaces from rust even under severe conditions of use.

An number of oil additives have been proposed in the past as rust inhibitors, but these have not been satisfactory for use in lubricating oils where severe corrosion conditions are encountered such as are present where the lubricated surfaces come in contact with sea water.

We have found that the reaction product of soyamine and dioctyl acid pyrophosphate will give excellent protection against rusting of ferrous metals in both ordinary water and sea water, even when the reaction product is present in relatively low concentrations in the lubricant.

The soyamine used in preparing the reaction product of this invention may be considered as a mixture of primary aliphatic amines prepared from soybean oil by subjecting the latter to hydrolysis and converting the carboxylate groups of the resulting fatty acids to amino groups. The latter may be accomplished, for example, by neutralizing the acids with ammonia, dehydrating the ammonium carboxylates to form the corresponding nitriles, and finally reducing the nitriles to amines. Commercially obtainable soyamines generally contain about 85 to 98% of primary aliphatic amines of 16 to 18 or more carbon atoms with about 80% of the amine content being in the form of unsaturated compounds such as octadecenyl and octadecadienyl primary amines. At least 70% of the preferred soyamine consists of unsaturated aliphatic primary amines having at least 18 carbon atoms in the chain. A typical commercial soyamine known as "Armeen SD (Distilled)" contained 97% of primary amines of which 10% was hexadecyl amine, 35% was octadecenyl amine, and 45% was octadecadienyl amine.

We have found that soyamines of the above type may be reacted in various proportions with dioctyl acid pyrophosphate to form an oil-soluble reaction product which has utility as a rust inhibitor in lubricants and as intermediates in the production of other organic phosphorus containing products. The reaction is exothermic and it is preferred to control the reaction so as to avoid temperatures which might cause decomposition. A temperature of about 50° to 80° C. is quite satisfactory, though somewhat higher temperatures may be employed.

The dioctyl acid pyrophosphate need not be the substantially pure material as the commercial type ester may be used. This commercial ester may contain other acid phosphates or phosphorus containing acids as impurities.

Reaction products in which the ratios of nitrogen to phosphorus are less than 1 are not as satisfactory as those with ratios of 1 to 2.5 moles of soyamine per atom of phosphorus. A reaction product having a ratio within the range of 1 to 1.1 is generally preferred. Suitable reaction products were made in accordance with the following examples.

*Example 1.*—To 183.5 grams of distilled soyamine (97% primary amine) having an average molecular weight of 296 was slowly added 125 grams of dioctyl acid pyrophosphate while maintaining a temperature of about 70° C. After the exothermic reaction had ceased the mixture was stirred for approximately one hour to insure completion of the reaction. The reaction product was a low melting oil-soluble solid and represents the addition reaction product of 2 moles of soyamine and 1 mole of dioctyl acid pyrophosphate. The product was quite effective at 0.025% concentration in solvent-refined lubricating oil, in preventing the corrosion of steel in sea water.

*Example 2.*—Under reaction conditions similar to those above the soyamine was reacted with dioctyl acid pyrophosphate in the proportions of 5 mols of the amine to 1 mol of the pyrophosphate. The reaction product was soluble in lubricating grade hydrocarbon oils and was quite effective as a corrosion inhibitor in such oils at concentrations as low as 0.05%.

*Example 3.*—The procedure of Example 1 was employed to make a reaction product from dioctyl acid pyrophosphate and a crude soyamine containing approximately 85% of primary aliphatic amines about 80% of which were long chain unsaturated aliphatic amines. The proportions employed corresponded to a nitrogen to phosphorus ratio of approximately 1.1 to 1 (or a mol ratio of amine to pyrophosphate of 2.2 to 1). The product was similar to that of Example 1 and substantially as effective as a corrosion inhibitor in lubricating oils.

*Example 4.*—Dioctyl acid pyrophosphate was reacted with a soyamine having the approximate composition: 20% hexadecylamine, 50% 9-octadecenylamine, and 30% 9,12-octadecadienylamine to form a clear very viscous, pale amber material with a specific gravity of about 0.95. The reaction product had a molar ratio of nitrogen to phosphorus of about 1.0 and a pH of about 5. This product was tested in a solvent-refined lubricating oil for its ability to protect metal surfaces from the rusting action of sea water. The reaction product was added to each of several samples of the same oil with a different concentration in each. Each of these samples was subdivided into four test portions and tested according to A. S. T. M. method D-665-42T, but using, in place of the distilled water specified therein a synthetic sea water prepared according to Procedure B of A. S. T. M. method D-665-47T.

All four portions of each of the four oil samples containing respectively 0.025, 0.05, 0.1 and 0.2% by weight of the reaction product passed the test. A sample of the same oil containing no additive failed to pass the test.

When tested in a manner similar to the above, the reaction products of the first three examples passed the resulting test with but few failures at the 0.025% concentration in the case of Examples 2 and 3. All samples of Examples 1 to 4 passed the rusting test at 0.05% concentration.

When using soyamine as the sole additive to the lubricating oil, the resulting tests failed at all of the concentrations mentioned above.

The preferred dioctyl acid pyrophosphate is the one having the 2-ethylhexyl isomer as each octyl group.

Lubricants containing reaction products of an alkyl acid phosphate and soyamine are disclosed and claimed in our copending application Serial No. 110,237, filed August 13, 1949.

Having disclosed our invention in considerable detail, it is our intention that the invention be not limited by any of the details of description unless otherwise specified, but rather be construed broadly within its spirit and scope as set out in the accompanying claims.

We claim:

1. The reaction product prepared by reacting a dioctyl acid ester of pyrophosphoric acid with 1 to 2.5 moles, per atom of phosphorus in the ester, of an amine composition containing at least 70% of unsaturated aliphatic primary amines each having at least 18 carbon atoms in the molecule until the reaction is substantially completed, the reaction being carried out at a temperature below that at which substantial decomposition of the reaction product occurs.

2. The reaction product of claim 1 wherein said ester is the substantially pure dioctyl acid pyrophosphate.

3. The reaction product of claim 1 wherein the proportions are approximately one mole of amine per one atom of phosphorus.

4. A lubricant for ferrous metals comprising a hydrocarbon oil and a rust-inhibiting quantity of an oil-soluble reaction product prepared by reacting a dioctyl acid ester of pyrophosphoric acid with 1 to 2.5 moles, per atom of phosphorus in the ester, of an amine composition containing at least 70% of unsaturated aliphatic primary amines each having at least 18 carbon atoms in the molecule until the reaction is substantially completed, the reaction being carried out at a temperature below that at which substantial decomposition of the reaction product occurs.

5. The lubricant of claim 4 wherein the ester of said reaction product is the substantially pure dioctyl acid pyrophosphate.

WILLARD H. WOODSTOCK.
THOMAS M. BECK.

References Cited in the file of this patent

UNITED STATES PATENTS

| Number | Name | Date |
|---|---|---|
| 2,005,619 | Graves | June 18, 1935 |
| 2,080,299 | Benning | May 11, 1937 |
| 2,285,854 | Downing | June 9, 1942 |
| 2,371,655 | Smith | Mar. 20, 1945 |
| 2,371,854 | Smith | Mar. 20, 1945 |
| 2,397,381 | Smith et al. | Mar. 26, 1946 |
| 2,400,611 | Smith | May 21, 1946 |
| 2,413,852 | Turner | Jan. 7, 1947 |

OTHER REFERENCES

Gerrard, J. Chem. Soc. (London), pages 1464 to 1469 (1940). (Copy available in Scientific Library.)